United States Patent [19]
Kalinsky

[11] Patent Number: 6,148,976
[45] Date of Patent: Nov. 21, 2000

[54] MULTI-SPINDLE MACHINE HIGH SPEED/LOW SPEED SYSTEM

[75] Inventor: Robert M. Kalinsky, Broadview Heights, Ohio

[73] Assignee: Logan Clutch Corporation, Westlake, Ohio

[21] Appl. No.: 09/325,247

[22] Filed: Jun. 3, 1999

Related U.S. Application Data

[60] Provisional application No. 60/088,631, Jun. 9, 1998.

[51] Int. Cl.[7] ....................................................... F16D 11/06
[52] U.S. Cl. .................... 192/18 A; 192/48.7; 192/12 C; 192/109 F
[58] Field of Search .............................. 82/118, 119, 129; 192/109 F, 12 C, 18 A, 48.7, 48.9

[56] References Cited

U.S. PATENT DOCUMENTS

| | | | |
|---|---|---|---|
| 4,644,819 | 2/1987 | Zugel | 192/48.9 X |
| 5,657,843 | 8/1997 | Sommer | 192/18 A |
| 5,730,037 | 3/1998 | Manning | 82/118 |

*Primary Examiner*—Charles A Marmor
*Assistant Examiner*—Saúl Rodriguez
*Attorney, Agent, or Firm*—Ralph E. Jocke; Daniel D. Wasil; David R. Percio

[57] ABSTRACT

A clutch arrangement for a multi-spindle machine includes a starting clutch 12 and a machine brake clutch 14 positioned on a starting clutch drive shaft 16. A high speed clutch 18 and a snubbing clutch 22 are positioned on a long worm drive shaft 20. All clutches are pneumatically operated by solenoid valves 40, 42, 44 and 46 and electrically actuated by electrical circuit 60. When the multi-spindle machine shifts from a high speed to a low speed, the present invention activates the machine brake clutch 14 and snubbing clutch 22 for a predetermined time period to cause the drive train gears to slow down allowing synchronous meshing with the low speed drive train of the multi-spindle machine to enable a reduction in machine cycle time.

22 Claims, 3 Drawing Sheets

MULTI-SPINDLE MACHINE HIGH SPEED/ LOW SPEED SYSTEM

CROSS-REFERENCE TO RELATED APPLICATION

This application claims the benefit of U.S. Provisional Application No. 60/088,631 filed Jun. 9, 1998.

TECHNICAL FIELD

This invention relates in general to multi-spindle machines. Specifically, this invention relates to a high speed/low speed system with brake for a multi-spindle machine that employs a starting/feed clutch, a brake clutch, a high speed clutch and a snubbing clutch that are pneumatically actuated and electronically controlled.

BACKGROUND ART

Multi-spindle machines are known in the prior art. Multi-spindle machines are used to mass produce standardized types of components. A multi-spindle machine typically has several work stations at which machining operations are performed. A piece of raw stock, such as a bar stock, enters the machine at a first station and as the machine indexes, various machining operations are performed. Once the station is indexed completely through the machine, a completed part is formed. The part is released, and the process is repeated for that station with a new piece of raw stock. An advantage of multi-spindle machines is that all stations in the machine are producing parts simultaneously, resulting in high production.

Multi-spindle machines (also referred to as multiple spindle machines) typically have a large indexing drum with four, five, six or eight stations thereon. Each of the stations carries a work piece. In all but one of the stations, where a new piece of stock enters, a machining operation is performed. After each operation is completed, the drum is rotated so that each work piece moves sequentially through the locations where the various operations are performed. Machining operations typically performed at a multi-spindle machine include turning and threading.

Most multi-spindle machines are very efficient in terms of producing standardized parts at a high rate. However, one drawback associated with a multi-spindle machine is that the entire machine operates off of a single main motor. The main motor simultaneously drives all of the devices and processes in the machine. Multi-spindle machines typically include a timing shaft with cams for the coordination of multiple machine operations. The operator of the machine is required to set up the cams operating off the timing shaft which is a very time consuming activity.

There is always a risk that one of the mechanisms within the machine will not function properly. If such a malfunction should occur and not be detected by an operator in time to shut the machine off, the machine will continue with its next cycle. In such a case, an attempt by the machine to index to its next position can cause severe damage. This is why it is common for an operator to be required to closely monitor multi-spindle machines.

Typically, the speed of multi-spindle machines changes from high to low speed and back again during the course of their operating cycle. High speed is normally used for times in the machine cycle when critical machining operations are not occurring. High speed operation is desirable when the stations are indexing, or when the tools are moving toward or away from the work pieces and are not performing work thereon. Low speed operation is used when the tools in the machine are forming the metal. Any attempt to operate the machine at a high speed when such forming work is being formed is likely to cause a problem or jam the machine.

It is the responsibility of the operator or set-up technician to set the points in the machine cycle where the machine makes its high speed and low speed shifts. Shifting from high speed too early results in slower cycle times and production rates. Similarly, the same result occurs if the shift from low to high speed is made too late. However, as previously discussed, if the shift from high to low speed is made too late (or the shift from low to high speed too early) this can result in damage to the machine, the tooling or the work piece.

Another disadvantage with the prior art multi-spindle machines is the time lag in the cycle when the machine shifts from high speed to low speed. This time lag is due to the gears traveling at the high speed. Undesirably long machine cycle times also result because the forming of the parts cannot occur until the machine is being driven at a low speed. As a result, the high-low speed clutch must disengage early enough in the cycle to allow the inertia to dissipate before metal working operations begin.

A co-pending patent application titled Multi-Spindle Machine Retrofit System which is assigned to the Assignee of the present invention U.S. patent application Ser. No. 08/871,019 filed on Jun. 6, 1997 and its contents hereby incorporated by reference describes a multi-spindle machine retrofit system that decreases the cycle time, minimizes wear on the drive train gears, and enables a more effective operation of a multi-spindle machine. That multi-spindle machine retrofit system includes a control system for optimizing machine performance.

U.S. Pat. No. 5,730,037 titled Multi-Spindle Machine Control System issued Mar. 24, 1998 filed as U.S. patent application Ser. No. 08/423,238 on Apr. 17, 1995 relates to a control system for optimizing multi-spindle machine performance. This patent is also assigned to the Assignee of the present invention and its contents are hereby incorporated by reference. Controllers provided on each side of the machine enable the operator to adjust parameters during operation and also communicate through an interface with an administrative work station.

U.S. Pat. No. 4,644,819 describes a high-low speed drive system for multiple spindle machines employing selective engagement and disengagement of associated pneumatic operated disc clutches.

There still exists a need for a high and low speed system (also referred to as high/low speed) with a brake for a multi-spindle machine that decreases the cycle time, minimizes wear on the drive train gears, and enables a more effective operation of a multi-spindle machine. The high/low speed system would include the ability to selectively vary torque capacity to certain clutches with an adjustable pressure control. Particularly, such a system would be preferably suited for retrofit on a Davenport Model B multi-spindle machine. The system would include a starting/feed clutch, a brake clutch, a high speed clutch, and a snubbing clutch which would decrease the cycle time between high and low speeds.

DISCLOSURE OF INVENTION

It is an object of the present invention to provide a multi-spindle machine high/low speed system that includes a control system that optimizes machine performance.

It is a further object of the present invention to provide a multi-spindle machine high/low speed system that lowers the cycle times for increasing production of the multi-spindle machine.

It is a further object of the present invention to provide a multi-spindle machine high/low speed system which reduces wear on the parts of the multi-spindle machine.

It is a further object of the present invention to provide a multi-spindle machine high/low speed system which is pneumatically actuated and electronically controlled.

It is a further object of the present invention to provide a multi-spindle machine high/low speed system capable of being retrofit.

It is a further object of the present invention to provide a multi-spindle machine high/low speed system which includes the ability to vary pressure (psi) for adjustably controlling torque capacity (ft. lb.) for the high speed clutch, the starting/feed clutch, and the snubbing clutch.

Further objects of the present invention will be made apparent following the Best Modes for Carrying Out Invention and the appended claims.

The foregoing objects of the present invention are accomplished by a high/low speed system for a multi-spindle machine. The multi-spindle machine includes a low speed drive train and a high speed drive train which drive the components of the multi-spindle machine at separate times. Both the low speed drive train and the high speed drive train are driven by a main motor, and drive the machine components through a common power drive train.

The system of the present invention includes a starting/feed clutch (also referred to as a starting clutch or a feed clutch), a brake clutch, a snubbing clutch, and a high speed clutch. The four clutches are incorporated into the drive train gear layout of the multi-spindle machine. All four clutches are pneumatically actuated and electronically controlled. The high speed clutch selectively engages the high speed gear train with the power drive train. When the high speed clutch is engaged, the multi-spindle machine operates at high speed. When the high speed clutch is disengaged, the multi-spindle machine operates at low speed.

The starting/feed clutch of the present invention engages the starting clutch drive shaft which selectively drives the long worm drive shaft by means of the high speed clutch.

The snubbing clutch (also called a snubbing brake) of the present invention which is advantageously also positioned in operative connection with the long worm drive shaft acts to selectively slow the rotation of the long worm drive shaft when switching to the low speed.

The present invention further includes a brake clutch positioned in operative connection with the starting clutch drive shaft. The brake clutch acts to selectively slow the rotation of the starting clutch drive shaft and can be applied for short periods whereby it acts to reduce the speed of rotation. The brake clutch can also be applied for a longer period of time whereby it acts to stop the rotation of the starting clutch drive shaft.

The high speed clutch and the snubbing clutch are both positioned on the long worm drive shaft. The high speed clutch is constructed for engagement with a gear on the starting clutch drive shaft and causes the long worm drive shaft to rotate at high speeds when desired. The snubbing clutch functions to selectively slow the rotation of the long worm drive shaft when switching over to a low speed operation. The snubbing clutch can also be applied for a longer period of time whereby it acts to stop the rotation of the long worm drive shaft completely.

Any or all of the clutches may have covers for protection from chips and other debris.

All clutches are controlled by an electrical control system which includes timers and limit switches. The limit switch for the snubbing clutch is positioned to interact with the timing shaft and cams of the multi-spindle machine. The limit switch is positioned in operative connection with the timing shaft to cause the machine to shift from high speed operation to low speed operation.

The timer is operative to store a time value which is counted down when the timer is energized. The timer is connected within the electrical control system to control a time period for the application of the snubbing clutch on the long worm drive shaft. The timer automatically resets when it has counted down the desired time value.

When it is desired to shift the multi-spindle machine from high speed to low speed, the control system receives a signal from the limit switch which is in operative connection to the snubbing clutch to release the high speed limit switch and to disengage the high speed clutch. The multi-spindle machine proceeds into a low speed operation which is normally a machining operation.

Specifically, the system of the present invention is particularly suited for retrofitting a multi-spindle machine, but also is suited for incorporation in a newly manufactured multiple spindle machine.

In retrofitting a multi-spindle machine, the starting clutch drive shaft is provided with a pneumatically actuated and electronically controlled starting clutch and machine brake clutch. The long worm drive shaft is provided with a high speed clutch and a snubbing clutch that are pneumatically actuated and electronically controlled.

In operation of the multi-spindle machine, the machine timing sequence includes the following steps: closing the high speed limit switch; actuating the high speed and starting/feed clutches while not engaging the snubbing clutch; withdrawing tool slides from the work piece at high speed; indexing the revolving head one position at high speed; feeding stock into position at high speed; returning the tools to the machining or working position at high speed; actuating with electronic means the snubbing brake and setting the cam; releasing the high speed limit switch which disengages the high speed clutch; feeding tools into the work pieces at slower speed; and disengaging the snubbing clutch with a variable controlled timer for low speed operation.

BEST MODES FOR CARRYING OUT INVENTION

Figure 1:
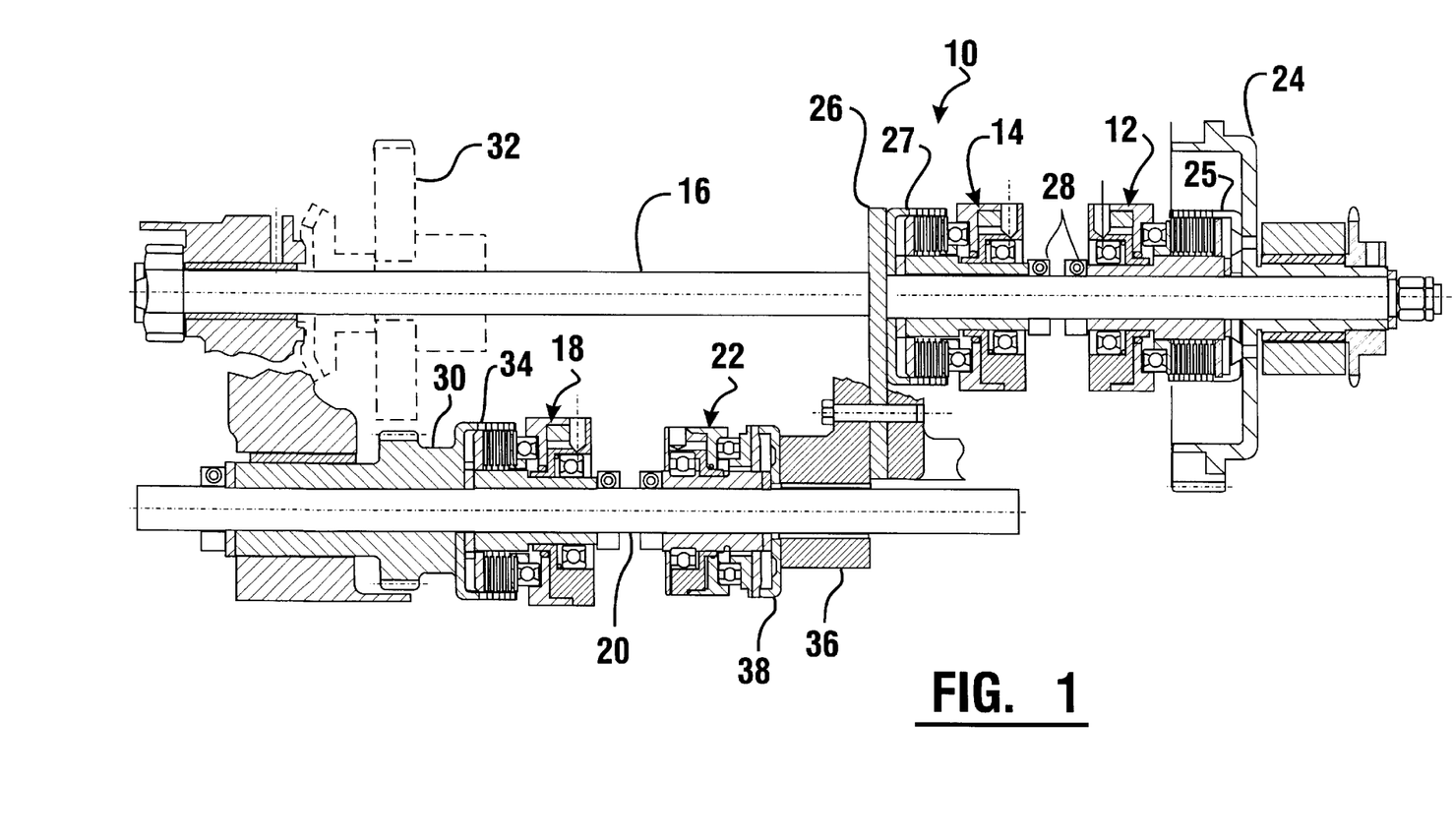
FIG. 1 is a sectional illustration of a portion of a multi-spindle machine incorporating the arrangement in accordance with the preferred embodiment of the present invention.

Referring now to the drawings where like numerals designate like or similar features throughout the several views, and particularly to FIG. 1, there is shown a portion of a multispindle machine incorporating the preferred embodiment of the high speed machine control system 10 in accordance with the present invention. In particular, the portion of the multi-spindle machine depicted applies to a Davenport Model B five spindle automatic screw machine. It should be immediately apparent that the present invention is equally applicable to any multispindle machine. A starting clutch 12 together with machine brake/clutch 14 are positioned on one end of the starting clutch drive shaft 16. Attached at an opposite end of the starting clutch drive shaft 16 is a quick index drive gear 32 shown in phantom line for engagement with the gears controlled by the high speed clutch 18. High speed clutch 18 is positioned on the long worm drive shaft 20 alone with snubbing clutch 22 spaced axially therefrom.

As is known to those skilled in this art, a multi-spindle machine includes in its power feed train a main motor and main motor sprocket (not shown) that engages and drives a main motor pulley. The power feed train of the multi-spindle machine incorporates a series of pulleys, gears and shafts for a high speed drive train and a low speed drive train. Both the high speed and low speed drive trains selectively act to drive the main drum shaft (not shown) of the machine. The main drum shaft is part of the power drive train which drives the part forming components of the machine. The low speed drive train consists of a plurality of reducing gear couples which act to substantially reduce rotational speed from that of the pulley shaft. Co-pending patent application titled Multi-Spindle Machine Retrofit System application Ser. No. 08/871,019 filed on Jun. 6, 1997 discusses a power drive train of a prior art multi-spindle machine in detail.

As is known, either the low speed drive train or the high speed drive train propels the power drive train of the multi-spindle machine at any one time. This is normally accomplished by having the low speed drive train always operating while the high speed drive train is selectively engaged. A rolling or running clutch is usually provided to allow a constant speed shaft to rotate at a higher speed when necessary for the high speed rotation. As mentioned earlier, one problem with the prior art is that there is an increased cycle time that results from untimely shifting from high to low speed which is inherent in the operation of the prior art power feed train and gear layout. The time lag is necessary to allow the drum shaft and all the connected components to slow down before moving in a powered condition at the lower speed. When the low speed drive train is engaged, the inertia of the normally driven gears tends to overcome the whiplash of the normally driving gears. This pull increases wear on the gears leading to reduced life.

Undesirably long machine cycle times also result because the forming of parts cannot occur until the machine is being driven at low speed. As a result, the high speed clutch must disengage early enough in the cycle to allow the inertia to dissipate before metal working operations begin.

Returning now to FIG. 1, the present invention advantageously provides starting clutch 12, machine brake clutch 14, high speed clutch 18 and snubbing clutch 22 which are all pneumatically actuated and electronically controlled, multi-disc friction clutches. All of the clutches are pneumatically operated with solenoid valves which supply the air to these clutches and are electrically actuated. Additionally, all of the clutches have an adjustable torque capacity directly dependent upon variable pressure. Therefore, these components are controllable independent of the machine cams on which the timing of the other machine component operations are dependent. The ability to vary torque capacity allows more efficient operation of the multispindle machine and to customize various machining operations. Further, the ability to selectively control pressure and as a result torque capacities for the individual clutches provides more efficient operation and better quality control. A computer or microprocessor (not shown) in communication with pressure control valves allows a programmable manufacturing operation with little or no potential for human operator error or intervention during a machining process.

Starting/feed clutch 12 as mentioned previously is a pneumatically operated multi-disc friction clutch. Preferably, clutch 12 is an eight disc (also referred to herein as disk) clutch that has a torque capacity of about 462 foot pounds (ft. lbs.) at about 80 pounds per square inch (psi) of pressure. Starting/feed clutch 12 is positioned at one end of starting clutch drive shaft 16. Starting/feed clutch 12 is anchored to a driving gear 24 with suitable fasteners known in the art. Preferably, starting/feed clutch 12 is a high capacity eight disc friction clutch which at a pressure of about 40 psi provides a torque capacity in foot pounds (ft. lbs.) of about 188 foot pounds. At a pressure of about 50 psi, it has a torque capacity of about 256 foot pounds. When the pressure is about 60 psi, it has a torque capacity of about 325 foot pounds. At a pressure of about 70 psi, there is a torque capacity of about 393 foot pounds. When there is a pressure of about 80 psi, it has a torque capacity of about 462 foot pounds. At a pressure of about 90 psi, there is a torque capacity of about 530 foot pounds. At a pressure of about 100 psi, it has a torque capacity of about 600 foot pounds.

There is also positioned on starting clutch drive shaft 16 machine brake clutch 14 which is also a pneumatically operated multi-disc friction clutch which has the ability to function as a brake. Preferably, machine brake clutch 14 is a standard capacity six disc brake which has a torque capacity of about 245 foot pounds at about 80 psi. At a pressure of about 40 psi brake clutch 14 has a torque capacity of about 90 foot pounds. At a pressure of about 50 psi, it has a torque capacity of about 129 foot pounds. When there is a pressure of about 60 psi, it has a torque capacity of about 167 foot pounds. At a pressure of about 70 psi, it has a torque capacity of about 206 foot pounds. At a pressure of about 80 psi, there is a torque capacity of about 245 foot pounds. At a pressure of about 90 psi, it has a torque capacity of about 283 foot pounds. At a pressure of about 100 psi, there is a torque capacity of about 322 foot pounds. Machine brake clutch 14 is positioned relatively adjacent starting feed clutch 12 on the same end of the starting clutch drive shaft 16, but is spaced therefrom and mounted to a fixed bracket 26 with suitable fasteners. Additional clamps 28 are provided at the other ends of the starting feed clutch 12 and machine brake clutch 14 for securing them on shaft 16.

The high speed clutch 18 is a pneumatically operated multi-disc friction clutch which is positioned on the long worm drive shaft 20. Gear 30 on long worm drive shaft 20 meshes with the quick index drive gear 32 which operatively connects the starting clutch drive shaft 16 and the long worm drive shaft 20. The high speed clutch 18 is mounted on the long worm drive shaft 20 so that its plurality of friction discs engage the drive cup 34 of gear 30 when the friction discs are compressed. When the discs are not compressed, gear 30 freewheels on long worm drive shaft 20. The high speed clutch 18 acts to engage the high speed drive train by selectively engaging quick index driven gear 30 which is engaged and driven by quick index drive gear 32. High speed clutch 18 is preferably a six disc friction clutch with an adjustable torque capacity with varying pressure. Its torque capacity with varying pressure is substantially identical to that of the machine brake clutch 14 in the preferred embodiment.

The snubbing clutch 22 is also a pneumatically operated multi-disc friction clutch. It is positioned on the long worm drive shaft 20 adjacent and spaced from the high speed clutch 18. Snubbing clutch 22 is mounted to a fixed bracket 36 which is attached to bracket 26 with suitable fasteners. The snubbing clutch is selectively engaged to control the speed of the long worm drive shaft 20 for controlling the speed of the main drum shaft. Since snubbing clutch 22 is pneumatically operated, it can be selectively engaged for short periods of time to achieve a quick deceleration of the long worm drive shaft 20 from a high speed to a low speed. This is done in the preferred form of the invention to synchronize speed before the low speed drive train is engaged. Preferably, the snubbing clutch 22 is a two disc standard capacity clutch with an adjustable torque capacity with pressure. At a pressure of about 40 psi, it has a torque capacity of about 8 foot pounds. At a pressure of about 45 psi, it has a torque capacity of about 15 foot pounds. At a pressure of about 50 psi, it has a torque capacity of about 21 foot pounds. With a pressure of about 55 psi, it has a torque capacity of about 28 foot pounds. At a pressure of about 60 psi, there is a torque capacity of about 34 foot pounds. At a pressure of about 65 psi, there is a torque capacity of about 41 foot pounds. With a pressure of about 70 psi, there is a torque capacity of about 47 foot pounds. When the friction discs of snubbing clutch 22 are compressed, they engage the cup 38 fastened to bracket 36 to slow the long worm drive shaft 20 down or even slow it to a halt.

Figure 2:
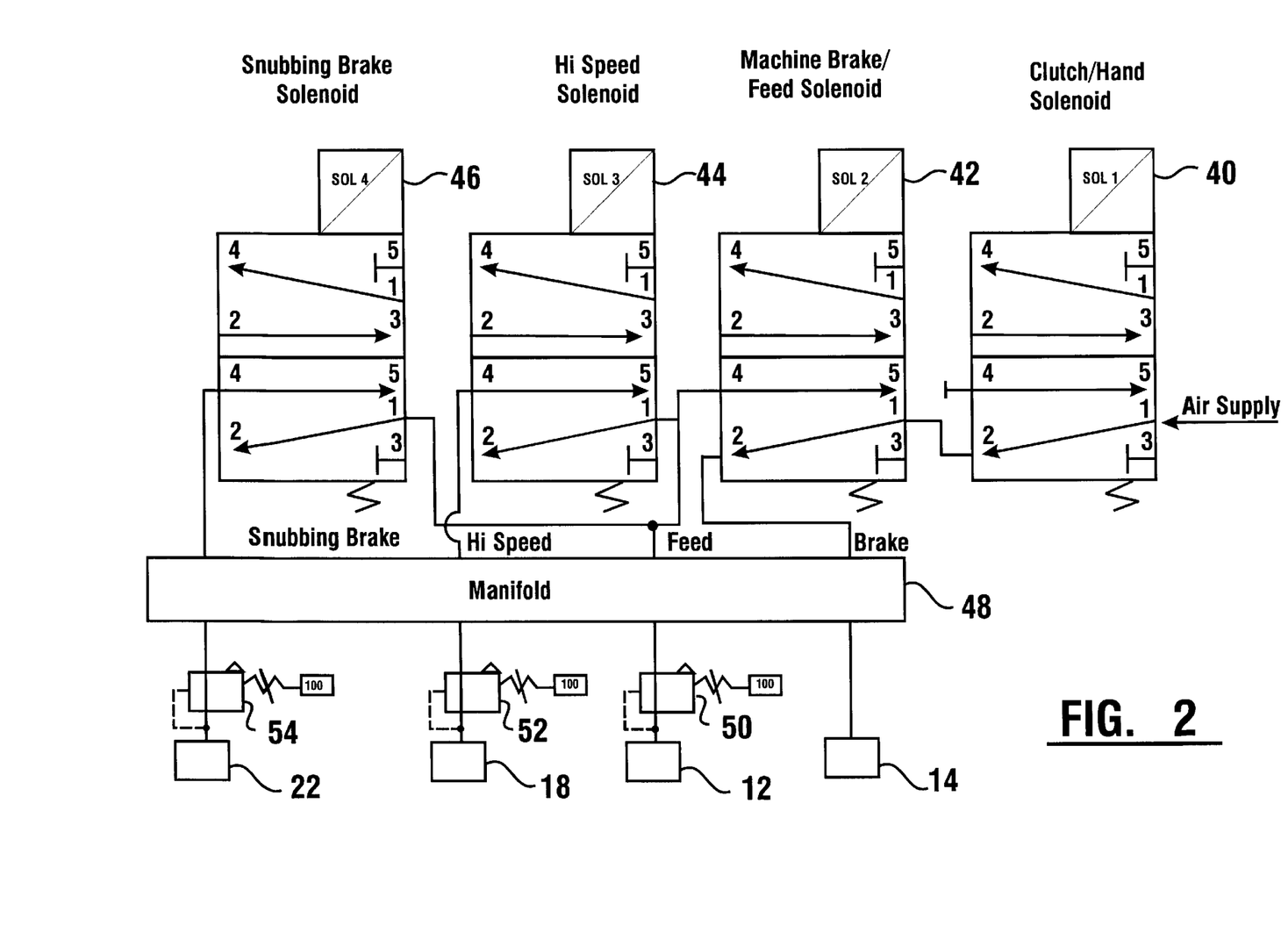
FIG. 2 is a schematic of the pneumatic flow diagram in accordance with the present invention.

Referring next to FIG. 2, there is shown a schematic of the fluid circuit for the present invention depicting air flow through the four solenoid valves 40, 42, 44, and 46. The schematic indicates an energized and a de-energized air flow schematic for each four port solenoid valve. The de-energized or default position is shown in the lower square and the air flow path for the energized position is shown in the upper square for each solenoid. All connections are made with suitable conduits or pressure lines. In solenoid valve 40, air from a source of compressed air (not shown) is supplied from port one to port two in its de-energized state. Port two is linked through a conduit or pressure line to inlet port one of solenoid valve 42. In the energized state of solenoid valve 40, the air supply is routed from port one to a vent in port four which effectively shuts off the air supply to solenoid valves 42, 44, and 46.

In the operation of solenoid valve 42, air is supplied from solenoid valve 40 at port one and in the de-energized state flows to port two through a conduit or pressure line to the brake clutch 14. In the de-energized state of solenoid valve 42, the friction discs of brake clutch 14 are compressed to engage the cup 27 fixed to bracket 26 which acts to slow the speed of starting clutch drive shaft 16 down and even into a stop position. In the energized state of solenoid valve 42, air flows from port one to port four supplying air pressure to port one of solenoid valve 44 and also to the starting feed clutch 12. Starting feed clutch 12 responds to the applied air pressure and is operative to compress the friction discs. This causes engagement of the friction discs with the drive cup 25 connected to gear 24, which causes starting clutch drive shaft 16 to rotate. At that time, the friction discs of the brake clutch 14 are no longer compressed since solenoid valve 42 is now energized, and no longer engage cup 27. This enables rotation of shaft 16.

In the operation of solenoid valve 44, port one in the de-energized state is vented to port two. In the energized state of valve 44, compressed air is received at port one when valve 42 is in its energized state. This compressed air from port one of valve 44 is routed through port four to the high speed clutch 18. In this state, the high speed clutch 18 selectively engages the high speed gear train with the power drive train through the compressed friction discs engaging drive cup 34 which is connected to gear 30. This results in the rotation of long worm drive shaft 20.

In the operation of solenoid valve 46, in the de-energized state air is enabled to flow from port one to vented port two.

Compressed air is received at port one of solenoid valve 46 from port four of solenoid valve 42 when valve 42 is in its energized state. When solenoid valve 46 is energized, air flow from port one is routed through port four to the snubbing brake clutch 22. Snubbing brake clutch 22 when engaged causes friction discs to engage cup 38 of bracket 36 which selectively controls the speed of the long worm drive shaft 20 by slowing it down for quick deceleration from a high speed to a low speed or even to a complete stop. Preferably, the solenoid valve arrangement of the present invention includes a manifold 48 for supplying air at a high pressure to allow varying torque capacity as previously mentioned. Controllable pressure valves 50, 52. and 54 allow pressure control for the starting clutch 12, high speed clutch 18 and snubbing brake clutch 22, respectively. The pressure controllers 50, 52, 54 are preferably in electrical communication with a computer or microprocessor (not shown) with an appropriate display for individually controlling the starting feed clutch 12, the high speed clutch 18, and the snubbing brake clutch 22. Optionally, machine brake clutch 14 may also contain its own separate variable pressure controller (not shown) for similar adjustable control of torque capacity.

Figure 3:
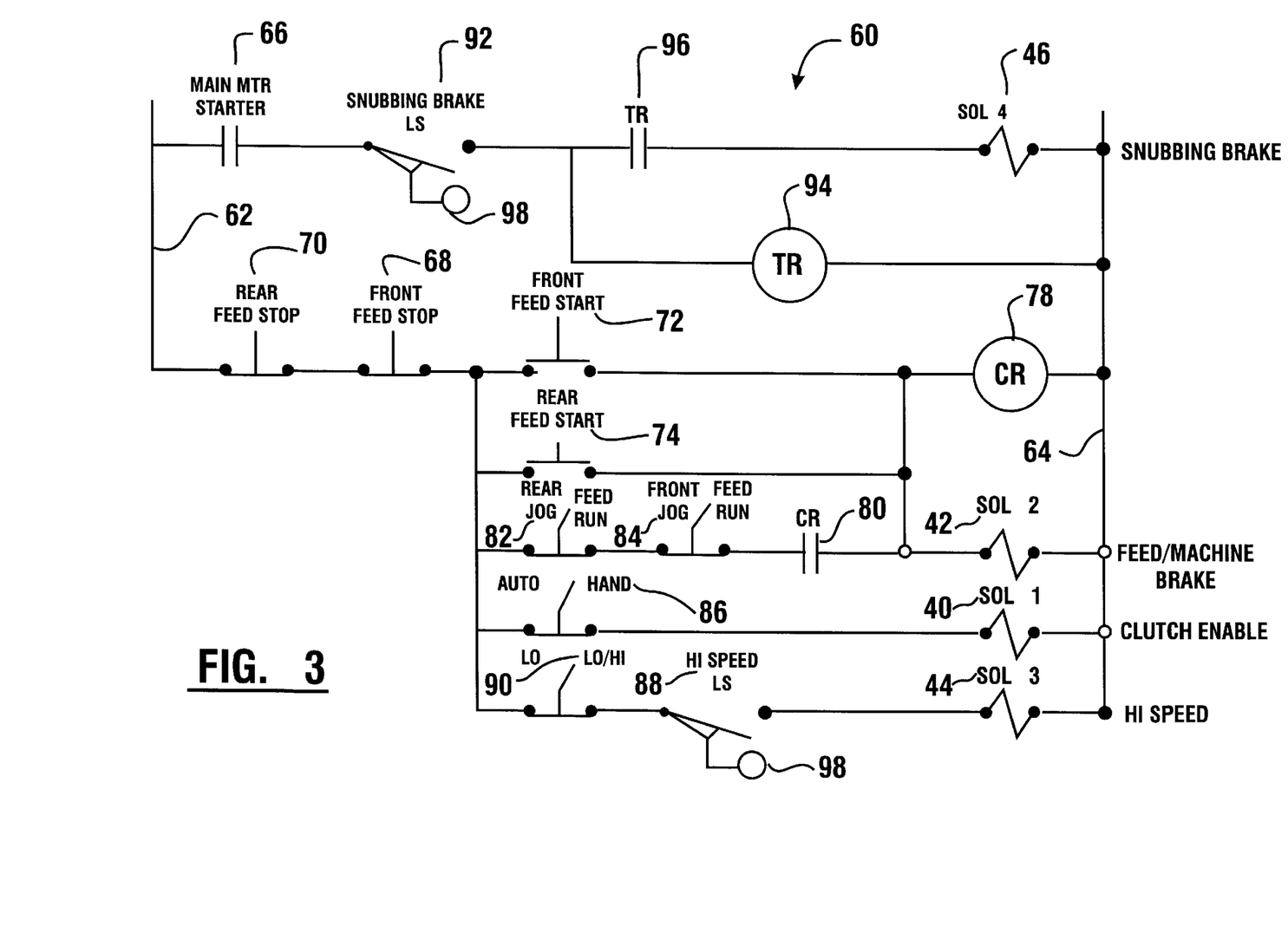
FIG. 3 is an electrical schematic for the present invention.

Turning next to FIG. 3, there is shown an electrical schematic 60 for the operation of the preferred embodiment of the present invention. The electrical schematic 60 shown is operable responsive to either manually actuated push button strips known in the art, as well as microprocessor controls. The electrical schematic 60 shows how power is supplied from the main motor to the solenoids and the manner in which they are electrically actuated. The electrical connections are made between electrical power leads 62 and 64. The main motor of the multispindle machine is started with the main motor starter switch 66. Power is also supplied through the front feed stop 68 and the rear feed stop 70. The actuation of either front feed start 72 or rear feed start 74 allows electricity to flow to control relay 78. Energizing control relay 78 closes control relay switch 80 and allows power to flow to solenoid 42. Solenoid 42 can be de-energized by the actuation of the front or rear feed stops 68, 70 or switching of the front or rear feed start switches 72, 74 respectively. Solenoid 42 can also be de-energized by actuation of either rear jog feed run switch 82 or the front jog feed run switch 84.

Solenoid 40 is de-energized in its default position and is energized when the hand auto switch 86 is turned to the hand position. As shown in FIG. 3, solenoid 40 is in its energized position. In this position, air is supplied to activate brake 14 so that neither the starting clutch drive shaft 16 or the long worm drive shaft 20 turns.

Solenoid 44 as shown is in its de-energized state and receives power when the high speed limit switch 88 is closed. Limit switch 88 is in operative connection with the timing shaft 98 and cams found on multi-spindle machines. When limit switch 88 is tripped or closed, this shifts the multi-spindle machine from the low speed drive train to the high speed drive train and the low-high switch 90 is switched to the low-high position. The multi-spindle machine can be kept in the low speed setting when the low to low-high switch 90 is switched into the low position which does not allow energizing solenoid valve 44.

The electrical schematic 60 also provides a snubbing brake clutch limit switch 92 which is also in operative connection with timing shaft 98 and when closed will provide electricity to timing relay 94. When timing relay 94 is initially energized, it closes timing relay switch 96 allowing electricity to flow to solenoid 46 for preferably a preprogrammed time period. Although the electrical schematic 60 for the present invention is shown as a wiring diagram control circuit, it can alternatively be comprised of solid state components. In the preferred embodiment of the present invention, the limit switch is an Omron limit switch Model No. D4CC2024, with LED indicators. The limit switches are electrically connected with the machine electrical panel for the multi-spindle machine. In alternative embodiments, the limit switches can be replaced with an encoder. The encoder is an absolute ten bit gray code encoder type which is positioned adjacent the timing shaft and produces signals representative of the angular position and velocity of the timing shaft. The encoder is connected to a microprocessor based controller which is operative to perform the operations of the timer or send a signal to the timer to initiate its countdown. Further description of the encoder and controller is contained in U.S. Pat. No. 5,730,037 Mar. 24, 1998 the content of which is incorporated herein by reference. In the preferred embodiment of the present invention, the timer is an Omron Model No. H3CA solid state timer. The timer contains a thumb wheel switch which allows the selection of a desired time unit and a desired timed countdown.

In operation of the preferred embodiment of the system, the electrical circuit 60 is initially in the position shown in FIG. 3. The operator first starts the main motor by depressing the main motor starter button 66. In this start up mode, solenoid valve 40 is de-energized and air supply is provided to brake clutch 14 to prevent the starting clutch drive shaft 16 and the long worm drive shaft 20 from turning. The operator can start starting feed clutch 12 by depressing or switching either the front feed start switch 72 or the rear feed start 74 which allows electricity to flow to control relay 78. Energizing control relay 78 closes control relay switch 80 and allows power to flow to solenoid valve 42. Solenoid valve 42 causes brake clutch 14 to release and activates the starting feed clutch 12 causing the starting clutch drive shaft 16 to turn. As long as the solenoid valve 44 is in a de-energized state the high speed clutch has not yet been activated. Similarly, as long as the solenoid valve 46 is in its de-energized state, the snubbing brake has not been activated either.

As the timing shaft causes the high speed limit switch 88 to close, both the high speed clutch 18 and the starting feed clutch 12 are actuated since solenoid valve 44 now becomes energized along with the energized solenoid valve 42. Snubbing brake clutch 22 is not yet actuated since solenoid valve 46 is still in the de-energized state. When the multi-spindle machine is in this state, tool slides are withdrawn from the work piece. The main drum or revolving head indexes one position. Stock is then fed into position and the tools returned to the working position. At this time, the timing shaft causes snubbing clutch limit switch 92 to close which energizes the timing relay circuit 94 to countdown to a preset period of time for energizing solenoid valve 46 which causes solenoid valve 46 to energize and actuate snubbing brake clutch 22. Simultaneously with snubbing clutch limit switch 92 closing, the timing shaft by way of a cam causes the high speed limit switch 88 to open or be released. Solenoid valve 44 becomes deenergized to allow snubbing clutch 22 to slow down the rotation of the long worm drive shaft 20 to that of the speed of the low speed drive train. Snubbing brake clutch 22 allows the long worm drive shaft 20 to slow to a desired speed for metal working operations (even to a stop position if desired) when the low speed drive train is engaged. Additionally, briefly actuating snubbing brake clutch 22 before beginning the machining operation reduces or eliminates end play in the gearing. The tools then feed into the work pieces as power is supplied through the low speed drive train during the machining operation. Timer relay 94 causes the timing relay switch 96 to open which de-energizes solenoid valve 46 to disengage the snubbing brake clutch 22.

As the timing shaft rotates, it eventually actuates the high speed limit switch 88 causing the limit switch 88 to energize solenoid valve 44. This puts the multi-spindle machine into operation with power being supplied through the high speed drive train. Energizing solenoid valve 44 allows air to flow to the high speed clutch 18 for engagement. This engages the high speed drive train through the long worm drive shaft 20. Thus, the high speed drive train moves the main shaft for withdrawing the tool slides at a high rate of speed. During this time, the tool slides are withdrawn from the work piece and the revolving head indexes one position. Then, stock is fed into position. Next, the tools return to their working position.

When the timing shaft rotates further it engages snubbing clutch limit switch 92 by means of a cam set and actuates the snubbing clutch 22 while at the same time releasing the high speed limit switch 88 for de-energizing solenoid valve 44 for releasing the high speed clutch 18. The deactivation of the high speed clutch 18 allows the high speed drive gear to operatively disengage from the starting clutch drive shaft 16. The multi-spindle machine then shifts from the high speed back to the low speed. During this time, the tools feed into the work piece. The timing relay circuit 94 is then energized and counts down to a preset time period to cause timing relay switch 96 to open for de-energizing solenoid valve 46. The foregoing process keeps repeating itself with the timing shaft and cams.

The operation of the system of the present invention enables a high to low speed shift to be accomplished rapidly. This avoids the need to wait for machine components to slow by dissipation of the inertia before metal working operations are begun. Reducing the time it takes the machine to change from high to low speed enables a reduction of cycle times. The present invention further reduces wear due to whiplash of the gears during the high to low speed shift. This extends gear life.

It is to be understood that while the foregoing description of the present invention relates particularly to its use in connection with a Davenport Model B Five Spindle automatic screw machine, the present invention can be applied to decrease the cycle times associated with the shift from high to low speed for any cam operated multi-spindle machine having a starting clutch drive shaft and a long worm drive shaft as described herein.

Thus, the new multi-spindle machine arrangement and system of the present invention achieves the above stated objectives, eliminates difficulties encountered in the use of prior devices and systems, solves problems and attains the desired results described herein.

In the foregoing description, certain terms have been used for brevity, clarity and understanding, however, no unnecessary limitations are to be implied therefrom because such terms are for descriptive purposes and are intended to be broadly construed. Moreover, the descriptions and illustrations herein are by way of examples and the invention is not limited to the details shown and described. Further, in the following claims any feature that is described as a means for performing a function shall be construed as encompassing any means capable of performing that function and shall not be limited to the particular means shown in the foregoing description or mere equivalents.

Having described the features, discoveries and principles of the invention, the manner in which it is constructed and operated, and the advantages and useful results attained; the new and useful structures, devices, elements, arrangements, parts, combinations, systems, equipment, operations and relationships are set forth in the appended claims.

I claim:

1. A clutch arrangement for a multiple spindle machine operable at a low speed or a high speed and having a timing shaft, the clutch arrangement comprising:

a starting clutch in generally surrounding relation with a starting clutch drive shaft, the starting clutch being selectively operative to cause rotation of the starting clutch drive shaft, wherein when the starting clutch is engaged the multiple spindle machine is operable at the low speed;

a machine brake clutch in generally surrounding relation with the starting clutch drive shafts and spaced longitudinally from the starting clutch, the machine brake clutch being selectively operative to slow the rotation of the starting clutch drive shaft, and wherein when the starting clutch is disengaged the machine brake clutch is selectively engaeable to cause the rotational speed of the starting clutch drive shaft to slow;

a high speed clutch in generally surrounding relation with a long worm drive shaft, the high speed clutch being in selectively operable connection with the starting clutch drive shaft and selectively operative to cause rotation of the long worm drive shaft, wherein when the high speed clutch is engaged the multiple spindle machine operates at the high speed; and a snubbing clutch in generally surrounding relation with the long worm drive shaft and spaced longitudinally from the high speed clutch, the snubbing clutch being selectively operative to slow the rotation of the long worm drive shaft, wherein when the high speed clutch is disengaged the snubbing clutch is selectively engageable to cause the rotational speed of the worm drive shaft to slow.

2. The clutch arrangement of claim 1 wherein the starting clutch, machine brake clutch, high speed clutch and snubbing clutch are pneumatically operated.

3. The clutch arrangement of claim 2 and further comprising a plurality of solenoid valves wherein the starting clutch is pneumatically operated by a starting clutch solenoid valve, the machine brake clutch is pneumatically operated by a machine brake clutch solenoid valve, the high speed clutch is pneumatically operated by a high speed clutch solenoid valve, and the snubbing clutch is pneumatically operated by a snubbing clutch solenoid valve.

4. The clutch arrangement of claim 3 wherein the solenoid valves are controlled by an electrical circuit.

5. The clutch arrangement of claim 4 wherein the electrical circuit is operative to be controlled by a microprocessor.

6. The clutch arrangement of claim 5 and further comprising a first limit switch, a second limit switch and a timer, wherein the first limit switch and the second limit switch are operative to be actuated by the timing shaft, and wherein the first limit switch is operative to actuate the timer and the timer is operative to energize the snubbing clutch solenoid valve for a selected time period, and wherein the second limit switch is operative to energize the high speed clutch solenoid valve.

7. The clutch arrangement of claim 5 and further comprising an encoder, wherein the encoder is operative to communicate the position and rotational velocity of the timing shaft to the microprocessor, and wherein the snubbing clutch solenoid valve is operative to be energized by the microprocessor for a selected time period, and wherein the high speed clutch solenoid valve is operative to be energized by the microprocessor.

8. The clutch arrangement of claim 1 wherein the starting clutch, machine brake clutch, high speed clutch and snubbing clutch are multi-disc friction clutches.

9. The clutch arrangement of claim 2 wherein the starting clutch, machine brake clutch, high speed clutch and snubbing clutch each have selectively adjustable torque capacity.

10. The clutch arrangement of claim 9 wherein the torque capacity of each of the starting clutch, machine brake clutch, high speed clutch and snubbing clutch is selectively adjustable responsive to variable pressure applied to each of the starting clutch, machine brake clutch, high speed clutch and snubbing clutch.

11. The clutch arrangement of claim 1 wherein the brake clutch is in connected relation with a stationary bracket, the stationary bracket situated substantially perpendicular to the longitudinal axis of the starting clutch drive shaft.

12. The clutch arrangement of claim 1 wherein the snubbing clutch is in connected relation with a stationary bracket, the stationary bracket situated substantially perpendicular to the longitudinal axis of the long worm drive shaft.

13. A method for operating a multiple spindle machine at a low speed or a high speed, the multiple spindle machine having a timing shaft, starting clutch drive shaft and a long worm drive shaft, wherein a starting clutch is in generally surrounding relation with the starting clutch drive shaft, wherein a machine brake clutch is in generally surrounding relation with the starting clutch drive shaft and spaced longitudinally from the starting clutch, wherein a high speed clutch is in generally surrounding relation with the long worm drive shaft, and wherein a snubbing clutch is in generally surrounding relation with the long worm drive shaft and spaced longitudinally from the high speed clutch, the method comprising:

selectively operating the starting clutch to cause rotation of the starting clutch drive shaft, wherein when the starting clutch is engaged the multiple spindle machine is operable at the low speed;

selectively operating the machine brake clutch to slow the rotation of the starting clutch drive shaft, wherein when the starting clutch is disengaged the machine brake clutch is selectively engaseable to cause the rotational speed of the starting clutch drive shaft to slow;

selectively operating the high speed clutch in selectively operable connection with the starting clutch drive shaft operative to cause rotation of the long worm drive shaft, wherein when the high speed clutch is engaged the multiple spindle machine operates at the high speed; and selectively operating the snubbing clutch to slow the rotation of the long worm drive shaft, wherein when the high speed clutch is disengaged the snubbing clutch is selectively engageable to cause the rotational speed of the worm drive shaft to slow.

14. The method according to claim 13 further comprising electronically controlling the starting clutch, machine brake clutch, high speed clutch, and snubbing clutch;

wherein the step of selectively operating the starting clutch includes:
selectively pneumatically operating the starting clutch;
wherein the step of selectively operating the machine brake clutch includes:

selectively pneumatically operating the machine brake clutch;

wherein the step of selectively operating the high speed clutch includes:
selectively pneumatically operating the high speed clutch;

wherein the step of selectively operating the snubbing clutch includes:
selectively pneumatically operating the snubbing clutch.

15. A clutch arrangement for a multiple spindle machine operable at a low speed or a high speed and having a timing shaft, starting clutch drive shaft and a long worm drive shaft, the clutch arrangement comprising:

a starting clutch adapted to be positioned in generally surrounding relation with the starting clutch drive shaft, whereby the starting clutch when positioned being selectively operative to cause rotation of the starting clutch drive shaft, whereby when the positioned starting clutch is engaged the multiple spindle machine is operable at the low speed;

a machine brake clutch spaced longitudinally from the starting clutch and adapted to be positioned in generally surrounding relation with the starting clutch drive shaft, whereby the machine brake clutch when positioned being selectively operative to slow the rotation of the starting clutch drive shaft, and whereby when the starting clutch is disengaged the positioned machine brake clutch is selectively engageable to cause the rotational speed of the starting clutch drive shaft to slow;

a high speed clutch adapted to be positioned in generally surrounding relation with the long worm drive shaft, whereby the high speed clutch when positioned being in selectively operable connection with the starting clutch drive shaft to cause rotation of the long worm drive shaft, and whereby when the positioned high speed clutch is engaged the multiple spindle machine operates at the high speed; and a snubbing clutch spaced longitudinally from the high speed clutch and adapted to be positioned in generally surrounding relation with the long worm drive shaft, whereby the snubbing clutch when positioned being selectively operative to slow the rotation of the long worm drive shaft, and whereby when the high speed clutch is disengaged the positioned snubbing clutch is selectively engageable to cause the rotational speed of the worm drive shaft to slow.

16. The clutch arrangement of claim 15 wherein the starting clutch, machine brake clutch, high speed clutch and snubbing clutch are pneumatically operated.

17. The clutch arrangement of claim 16 and further comprising a plurality of solenoid valves wherein the starting clutch is pneumatically operated by a starting clutch solenoid valve, the machine brake clutch is pneumatically operated by a machine brake clutch solenoid valve, the high speed clutch is pneumatically operated by a high speed clutch solenoid valve, and the snubbing clutch is pneumatically operated by a snubbing clutch solenoid valve.

18. The clutch arrangement of claim 17 wherein the solenoid valves are controlled by an electrical circuit.

19. The clutch arrangement of claim 18 wherein the electrical circuit is operative to be controlled by a microprocessor.

20. The clutch arrangement of claim 19 and further comprising a first limit switch, a second limit switch and a timer, wherein the first limit switch and the second limit switch are operative to be actuated by the timing shaft, and wherein the first limit switch is operative to actuate the timer and the timer is operative to energize the snubbing clutch solenoid valve for a selected time period, and wherein the second limit switch is operative to energize the high speed clutch solenoid valve.

21. The clutch arrangement of claim 19 and further comprising an encoder, wherein the encoder is operative to communicate the position and rotational velocity of the timing shaft to the microprocessor, and wherein the snubbing clutch solenoid valve is operative to be energized by the microprocessor for a selected time period, and wherein the high speed clutch solenoid valve is operative to be energized by the microprocessor.

22. The clutch arrangement of claim 16 wherein the starting clutch, machine brake clutch, high speed clutch and snubbing clutch each have selectively adjustable torque capacity.

* * * * *